United States Patent

[11] 3,556,435

| [72] | Inventor | Elmer O. Wangerin<br>Rochester, N.Y. |
|---|---|---|
| [21] | Appl. No. | 730,523 |
| [22] | Filed | May 20, 1968 |
| [45] | Patented | Jan. 19, 1971 |
| [73] | Assignee | Eastman Kodak Company<br>Rochester, N.Y.<br>a corporation of New Jersey |

[54] FILM-THREADING APPARATUS
14 Claims, 4 Drawing Figs.

[52] U.S. Cl. ................................................. 242/210,
242/195
[51] Int. Cl. ....................................................... G11b 15/32,
G11b 15/66
[50] Field of Search ........................................... 242/192,
195, 210, 197, 198, 71.1, 74

[56] References Cited
UNITED STATES PATENTS

| 2,015,860 | 10/1935 | May ............................. | 242/195UX |
| 3,348,784 | 10/1967 | Gardiner et al. ............... | 242/192 |

*Primary Examiner*—George F. Mautz
*Attorneys*—Robert W. Hampton and G. Herman Childress ABSTRACT: A film-threading apparatus or system of the type in which a roller member engages the flanges of a film supply reel rotating in an unwinding direction and locally flexes the flanges toward one another to cause the leading end of a roll of film on the reel to separate from the roll and enter a film guide channel, is provided with a novel roller member adapted to perform the foregoing function in cooperation with reels of different axial dimensions so that the apparatus can accommodate films of corresponding different widths.

PATENTED JAN 19 1971
3,556,435
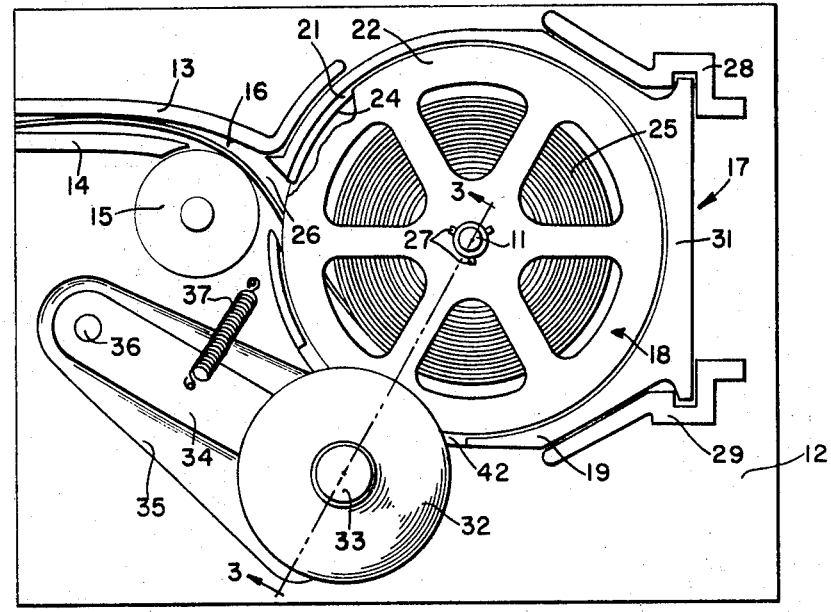
FIG. 1
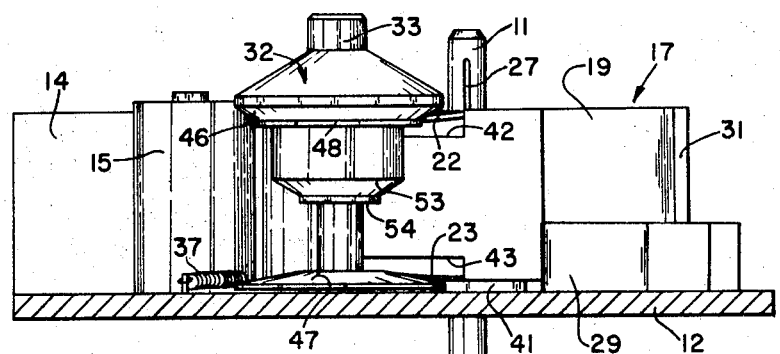
FIG. 2
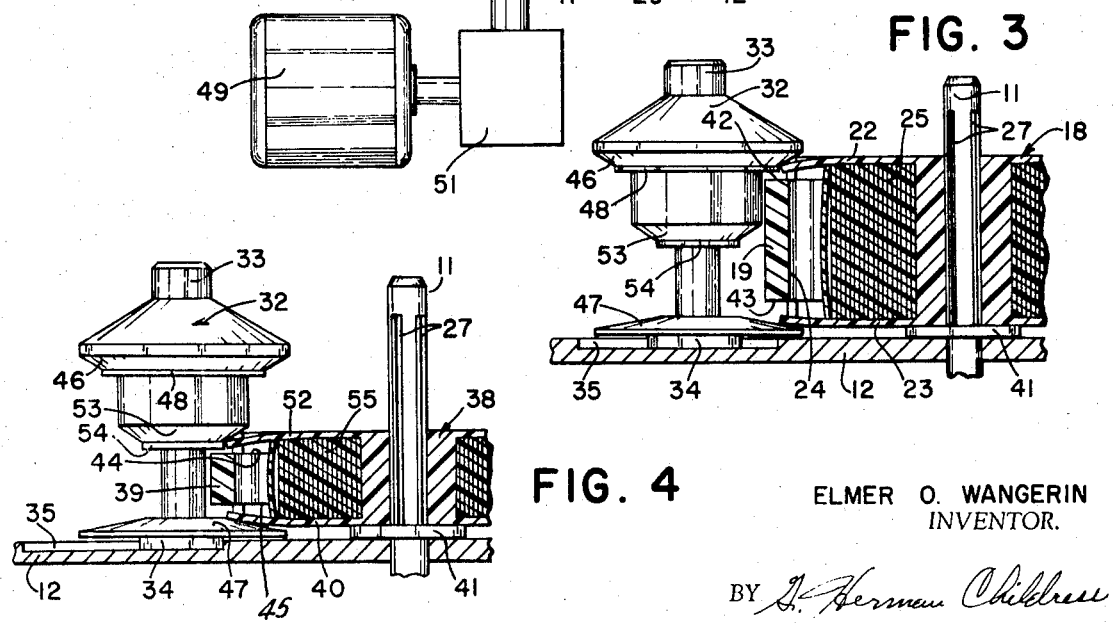
FIG. 3
FIG. 4
ELMER O. WANGERIN
INVENTOR.
BY H. Herman Childress
Robert W Hampton
ATTORNEYS 3,556,435

FILM-THREADING APPARATUS

BACKGROUND OF THE INVENTION

1. Field of the Invention

The present invention relates to film-threading apparatus and more particularly to such apparatus of the type in which a roller member engages the flanges of a film supply reel rotating in an unwinding direction and locally flexes the engaged flanges toward one another to cause the leading end of a roll of film on the reel to be separated from the roll and fed into a guide channel.

2. Description of the Prior Art

As disclosed in commonly assigned pending application Ser. No. 591,235, entitled Apparatus for and Method of Feeding Strip Material filed in the name of Norman J. Rosenburgh, on Nov. 1, 1966, now U.S. Pat. No. 3,467,340, film-threading apparatus of the type referred to above comprises a spoollike roller member, the two end flanges of which are provided with inwardly tapering conical surfaces. The roller member is rotatably supported in aligned parallel relation to a film supply reel carried by a rotatable spindle and is biased laterally toward the reel so that opposed localized portions of the two reel flanges are engaged and flexed toward one another by the corresponding conical surfaces of the rotatable roller member. Thus, as the reel is driven in an unwinding direction about its axis, successive portions of the reel flanges are flexed into transverse squeezing engagement with the outermost convolution of the film supply roll on the reel. The resulting transverse distortion of the filmstrip causes it to move tangentially away from the film supply roll and into contact with film guide surfaces partially surrounding the roll, whereby the film is directed along a predetermined path defined by such guide surfaces and other appropriate guide channel means.

SUMMARY OF THE INVENTION

The present invention is directed to improving a film-threading apparatus of the type described above by enabling it to accommodate film supply reels of different axial dimensions corresponding to different widths of film supplied thereon; thus adapting the system to function properly in film projectors or reader devices intended to be loaded with film of such different widths, without requiring substitution of one or more components of the film threading mechanism. Briefly, this objective is accomplished according to the invention by means of a threading roller including several conical flange engaging surfaces, different pairs of which are adapted to engage and flex the respective end flanges of corresponding film reels of different axial dimensions when such reels are mounted on the same reel spindle.

Various means for practicing the invention and other features and advantages thereof will be apparent from the following detailed description of a preferred embodiment thereof, reference being made to the accompanying drawings in which like reference numerals refer to like elements.

BRIEF DESCRIPTION OF THE DRAWINGS

In the accompanying drawings:

FIG. 1 is a plan view of a portion of a film reader device provided with an improved film threading apparatus according to a preferred embodiment of the present invention illustrated in cooperation with a magazine loaded film supply reel;

FIG. 2 is a front elevational view of the structure depicted in FIG. 1;

FIG. 3 is a partially cross-sectioned view of the structure shown in FIGS. 1 and 2 taken along the line 3–3 of FIG. 1; and FIG. 4 corresponds to FIG. 3 but depicts a magazine loaded reel of film of narrower width loaded onto the reader device.

DESCRIPTION OF THE ILLUSTRATIVE PREFERRED EMBODIMENT

The film reader device partially depicted in the accompanying drawings to illustrate the preferred embodiment of the invention is of the type disclosed in greater detail in commonly assigned pending U.S. Pat. application Ser. No. 730,450, now U.S. Pat. No. 3,528,628 entitled "Reel Spindle Drive Means for Film Reader or the Like", filed in the name of Elmer O. Wangerin on May 20, 1968. Briefly, such a reader device comprises a film supply reel spindle 11 rotatably supported by a stationary support plate partially shown at numeral 12 and a corresponding film takeup reel spindle, not shown, which is similarly supported by the opposite end portion of the support plate 12. Toward the illustrated end of the support plate 12, a pair of film guide wall members 13 and 14 and a film guide roller member 15 cooperate to define a film guide channel 16 aligned with a film gate, not shown, whereby a strip of film fed along guide channel 16 is directed into the gate. At the opposite side of the film gate, a similar set of film guide members defines a corresponding film guide channel by means of which the end of the strip of film emerging from the gate is guided into engagement within a self-threading film takeup reel mounted on the film takeup reel spindle.

A film supply magazine unit 17 is adapted to be installed on the reader device and is generally similar to the corresponding structure disclosed in the above-identified patent to Rosenburgh. Such a magazine unit 17 comprises a film reel 18 laterally enclosed by a magazine member 19 provided with an internal rib 21 projecting inwardly from and spaced between the edges of the respective upper and lower reel flanges 22 and 23. The cylindrical inner film guide surface 24 of the rib 21 laterally surrounds the roll of film 25 between the flanges 22 and 23 of the reel 18 except in the region of film throat 26, which extends through the magazine member 19 to define the only passageway through which film can be withdrawn from the magazine unit 17.

When the magazine unit 17 is installed on the reader device, reel 18 is supported on spindle 11 and is engaged by splines 27 thereof so that rotation of the spindle 11 is imparted to the reel 18. Additionally, support lugs 28 and 29 on support plate 12 receive a base portion 31 of the magazine member 19 to maintain it in a predetermined position in which it is concentric with the reel 18 with its throat opening 26 in alignment with the corresponding end of film guide channel 16.

Threading roller 32 is rotatably supported laterally adjacent the magazine unit 17 by shaft 33 carried by support bar 34, which is pivotally attached to the support plate 12 within recess 35 thereof by pivot pin 36. A spring 37 biases the threading roller 32 toward the film magazine unit 17, but allows it to be moved aside manually to permit the magazine unit 17 to be installed axially onto the reader device.

By comparing FIG. 1–3 with FIG. 4, it will be seen that the illustrative reader device is adapted to accommodate magazine-loaded reels of film of two different widths; for example 35mm. film in the case of the magazine unit 17 shown in FIGS. 1–3 and 16mm. film in the case of the magazine shown in FIG. 4. Except for their different axial dimensions, however, the 35mm. reel 18 and magazine member 19 are substantially identical to a corresponding 16mm. reel 38 and magazine member 39. Also, it should be noted that the lower flanges 23 and 40 of the respective 35mm. and 16mm. reels 18 and 38 both assume the same installed position, as defined by reel support collar 41 on supply reel spindle 11.

Adjacent the threading roller 32 and in lateral alignment with the reel flanges, the magazine members are provided with upper and lower recesses shown respectively at 42 and 43 in FIGS. 1–3 and at 44 and 45 in FIG. 4. Referring first to the 35mm. magazine unit 17 shown installed on the reader device in FIGS. 1–3, recesses 42 and 43 are aligned respectively with inwardly tapering conical surfaces 46 and 47 of the threading roller 32 so that the surfaces 46 and 47 can engage the corresponding upper and lower 35mm. reel flanges 22 and 23 under the influence of spring 37. As best depicted in FIG. 3, such engagement of the reel flanges 22 and 23 by the respective conical roller surfaces 46 and 47 causes the corresponding region of the flanges 22 and 23 to be flexed toward one another as the threading roller 32 is resiliently maintained by spring 37 at a position established by the lateral engagement of the edge of upper 35mm. reel flange 22 with a cylindrical lip or surface 48 immediately below the upper conical surface 46 of the threading roller 32. Accordingly, when the supply reel 18 is driven in an unwinding direction, by drive means represented in FIG. 2 by motor 49 and gear unit 51, successive portions of the outermost convolution of a 35mm. film roll 25 are flexed transversely as depicted in FIG. 3, thereby causing the leading end of the film to separate and move tangentially away from the film roll 25. As described in greater detail in the aforementioned patent to Rosenburgh, the leading end of the filmstrip is thus moved laterally into contact with the internal guide surface 24 of the magazine member 19, which guides it into the magazine throat 26 communicating with film guide channel 16. It should also be noted that cylindrical lip 48 serves to maintain the threading roller 32 slightly beyond the portion of the magazine member 19 adjacent thereto to prevent interference with free rotation of the threading roller 32.

When a 16mm. magazine is installed on the reader device as represented by FIG. 4, the lower reel flange 40 and the corresponding lower magazine recess 45 are aligned with the lower conical surface 47 of the threading roller 32 as previously described, with a top reel flange 52 and its corresponding magazine recess 44 now in alignment with a smaller diameter intermediate conical roller surface 53. Accordingly, spring 37 now positions the threading roller 32 closer to the reel spindle 11 at a location defined by the engagement of the edge of the upper 16mm. reel flange 52 with cylindrical lip or surface 54 adjacent the intermediate conical roller surface 53. Therefore, successive regions of the 16mm. reel flanges 52 and 40 are flexed toward one another in the same manner described above to cause the leading end of the film on film roll 55 to be threaded into and along guide channel 16 as reel 38 is driven in an unwinding direction.

Since the lower conical surface 47 of the threading roller 32 engages the lower flange of both the 35mm. and 16mm. reels, but at different radii along the surface 47, it will be recognized that the lower flange 40 of the 16mm. reel 38 is flexed somewhat more than that of the 35mm. reel 18. Therefore, the lower conical roller surface 47 is preferably considerably flatter than the opposing upper and intermediate surfaces 46 and 53. Alternatively, the threading roller 32 might be adapted to flex only the upper flanges 22 and 52 of the reels 18 and 38, in which case the lower reel flanges 23 and 40 could be supported by a substantially flat annular flange of the threading roller 32 or by other means independent of the roller 32. Also, it should be appreciated that the threading roller 32 could be adapted to accommodate reels of more than just two different sizes by providing corresponding additional conical surfaces therealong.

The invention has been described in detail with reference to preferred embodiments thereof, but it will be understood that variations and modifications can be effected within the spirit and scope of the invention as described hereinabove and as defined by the appended claims.

I claim:

1. A threading roller for use in apparatus for handling a strip, the apparatus including:
   a. a reel spindle for selectively mounting one of at least first and second reels each having first and second flanges, the first and second flanges of the first reel being spaced apart a distance greater than the spacing between the first and second flanges of the second reel; and
   b. roller supporting means for supporting said threading roller rotatably about an axis substantially parallel to the spindle, said supporting means being movable to selectively locate said threading roller in either a first position or a second position with respect to the spindle, said threading roller comprising:
   c. means defining a first conical surface on said threading roller substantially concentric with the axis, said first conical surface being disposed to engage the first flange of the first reel when the first reel is mounted on said spindle and to flex the first flange toward the second flange of the first reel when said threading roller is disposed in said first position; and
   d. means defining a second conical surface on said threading roller substantially concentric with the axis, said second conical surface being spaced along the axis from said first conical surface, said second conical surface being disposed to engage the first flange of the second reel when the second reel is mounted on said spindle and to flex the first flange toward the second flange of the second reel when said threading roller is disposed in said second position.

2. A threading roller according to claim 1 including means defining a third conical surface concentric with the axis, said third conical surface disposed in opposed spaced relation to said first and second conical surfaces thereof, said third conical surface being disposed to engage and effect oppositely directed flexure of the contacted region of the second flange of either the first or second reel when such a reel is supported by the spindle and so engaged by said threading roller.

3. A threading roller according to claim 2 including:
   a. means defining a first cylindrical surface concentric with the axis, said first cylindrical surface extending from an inner periphery of said first conical surface toward said third conical surface; and
   b. means defining a second cylindrical surface of smaller diameter than said first cylindrical surface, said second cylindrical surface disposed concentrically about the axis and extending from an inner periphery of said second conical surface toward said third conical surface.

4. A threading roller as claimed in claim 1 including a cylindrical surface coaxial with respect to said first conical surface, said cylindrical surface meeting said first conical surface to form an inner periphery of said first conical surface, said cylindrical surface disposed to engage an edge of the first flange of the first reel to thereby define said first position of said threading roller.

5. A threading roller according to the claim 2, wherein the first, second and third conical surfaces intersect the axis respectively at first, second and third angles, said third angle being greater than either of said first and second angles.

6. A threading roller for engaging one of at least first and second reels, each of which has a pair of flanges, the flanges of the first reel being spaced apart a distance greater than the spacing between the flanges of the second reel, said threading roller being mounted on a first spindle for rotation about a first axis, the first spindle having first and second positions and including means for movement to the first and second positions, and either of the first and second reels being mounted on a second spindle for rotation about a second axis, said threading roller comprising in coaxial relation to the first axis:
   a. a first conical surface disposed to engage one flange of the first reel when mounted on the second spindle and to flex the one flange toward the other flange of the first reel when the first spindle is located in its first position a first distance from the second spindle; and
   b. a second conical surface disposed to engage one flange of the second reel when mounted on the second spindle and to flex the one flange toward the other flange of the second reel when the first spindle is located in its second position a second distance greater than said first distance from the second spindle.

7. A threading roller as claimed in claim 6, wherein said threading roller includes first and second ends, said first and second conical surfaces being tapered from the first axis toward said first end, said threading roller further including a third conical surface tapered from the first axis toward said second end, said third conical surface disposed to cooperate with said first and second conical surfaces to flex both of the flanges towards each other when said threading roller is brought into engagement with either the first or second reel.

8. A threading roller as claimed in claim 7, wherein said first conical surface has an inner periphery of a first diameter, and said second conical surface has an outer periphery of a second diameter, said second diameter being equal to or less than said first diameter.

9. A strip handling device for alternatively receiving coils of strip material of differing widths and for feeding a leading strip portion from a coil so received, said device comprising:
   a. means for alternatively receiving and rotatably supporting such coils;
   b. means for rotating a received coil;
   c. first means, mounted for movement between a position spaced from said receiving means and a position in operative relation with a coil of first width on said receiving means, for transversely flexing a peripheral winding of the strip of a first coil of first width when such first coil is received by said receiving means and said first means is disposed in said operative position;
   d. second means, mounted for movement between a position spaced from said receiving means and a position in operative relation with a coil of second width on said receiving means, for transversely flexing a peripheral winding of the strip of a second coil of second width when such second coil is received by said receiving means and said second means is disposed in said operative position; and
   e. means for selectively moving said first and second flexing means between said spaced and operative positions.

10. Strip-handling apparatus for separating the leading ends of first and second elongated strips disposed in coils about first and second hub members, the first and second hub members including respectively first and second guide surfaces between which the first and second elongated strips are disposed, both the first and second hub members being rotatably mountable in an operative position, said strip-handling apparatus comprising:
   a. a first cam surface disposed to engage the first guide surface of the first hub member when the first hub member is rotatably mounted in operative position and to flex the first guide surface of the first hub member toward the second guide surface of the first hub member to thereby facilitate the separation of the leading end of the first elongated strip from its respective coil;
   b. a second cam surface disposed to engage the first guide surface of the second hub member when the second hub member is rotatably mounted in operative position to flex the first guide surface of the second hub member toward the second guide surface of the second hub member to thereby facilitate the separation of the leading end of the second elongated strip from its respective coil; and
   c. means for moving said strip-handling apparatus to a first position remote from the guide surfaces of either of the first or second rotatably mounted hub members and to a second position wherein said first and second cam surfaces respectively engage the first guide surface of the first and second hub members when rotatably mounted in operative position.

11. Strip-handling apparatus for selectively separating a leading strip portion from at least one of first and second rotatable coils of elongated strip, the width of the strip of the first coil being greater than the width of the strip of the second coil, said strip-handling apparatus comprising:
   a. means for rotatably supporting either of the first and second coils in an operative position;
   b. first means including a first surface for transversely flexing a peripheral winding of the strip of the first coil when said strip-handling apparatus is disposed in operative relation with the rotatably supported first coil; and
   c. second means including a second surface for transversely flexing a peripheral winding of the strip of the second coil when said strip-handling apparatus is disposed in operative relation with the rotatably supported second coil.

12. The invention as defined in claim 11 further including means for moving said strip-handling apparatus between a nonoperative position and either of:
   a. a first position in operative relation with the rotatably supported first coil; and
   b. a second position in operative relation with the rotatably supported second coil.

13. Strip-handling apparatus for separating from their respective coils the leading ends of first and second elongated strips disposed in coils about first and second hub members, the first and second hub members including respectively first and second flange members between which the first and second elongated strips are disposed, both the first and second hub members being rotatably mountable in an operative position, said strip-handling apparatus comprising:
   a. a first conical surface disposed to engage the first flange member of the first hub member when the first hub member is rotatably mounted in operative position and to flex the first flange member of the first hub member toward the second flange member of the first hub member to thereby facilitate the separation of the leading end of the first elongated strip from its respective coil;
   b. a second conical surface disposed to engage the first flange member of the second hub member when the second hub member is rotatably mounted in operative position to flex the first flange member of the second hub member toward the second flange member of the second hub member to thereby facilitate the separation of the leading end of the second elongated strip from its respective coil; and
   c. means for moving said strip-handling apparatus to a first position remote from the flange members of either of the first or second rotatably mounted hub members and to second and third positions wherein said first and second conical surfaces respectively engage the first flange member of the first and second hub members when either is rotatably mounted in operative position.

14. The invention as defined in claim 13 wherein the second and third positions of said strip-handling apparatus coincide.